350-429

XR  4,083,057

United States
Quinn

[11] 4,083,057
[45] Apr. 4, 1978

[54] FOCUS SIZE COMPENSATION

[75] Inventor: Peter T. Quinn, Littleton, Colo.

[73] Assignee: Honeywell Inc., Minneapolis, Minn.

[21] Appl. No.: 739,664

[22] Filed: Nov. 8, 1976

[51] Int. Cl.² .................... G03B 3/00; G03B 7/08; G03B 13/02
[52] U.S. Cl. .................... 354/25; 350/187; 352/140; 354/195; 354/197
[58] Field of Search ............... 352/139, 140; 358/226; 354/25, 195, 197; 350/187, 255

[56] References Cited

U.S. PATENT DOCUMENTS

| 3,431,052 | 3/1969 | Jacknau | 355/58 |
| 3,972,056 | 7/1976 | Tsujimoto et al. | 354/25 |

*Primary Examiner*—John Gonzales
*Attorney, Agent, or Firm*—H. L. Hanson; C. J. Ungemach

[57] ABSTRACT

A zoom lens system is shown for use in conjunction with the normal optical elements of an automatic focusing camera to correct the change in magnification which occurs when a lens system focused on a far subject is refocused on a nearer subject or vice versa.

15 Claims, 1 Drawing Figure

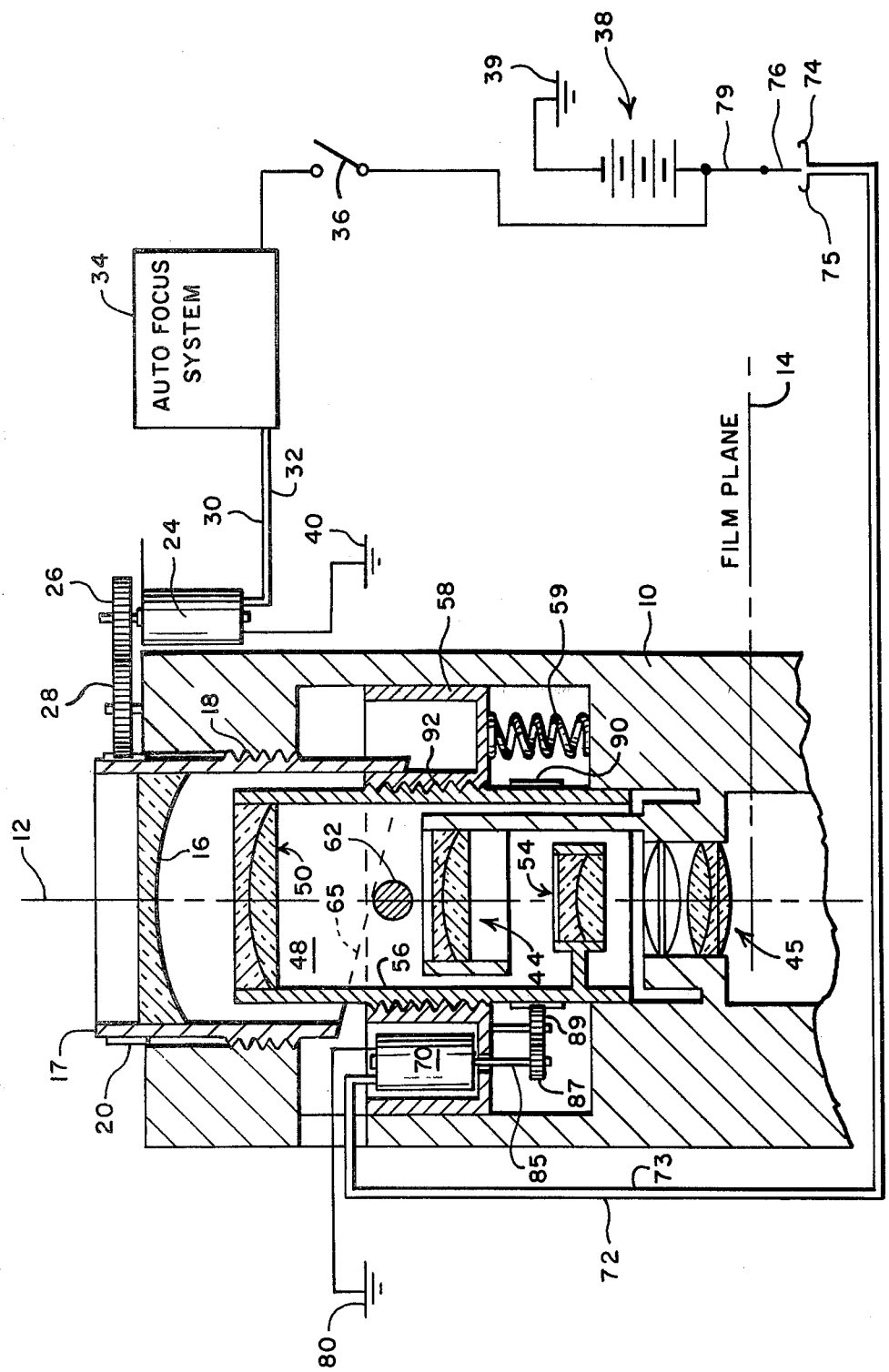

FOCUS SIZE COMPENSATION

BACKGROUND OF THE INVENTION

The present invention relates to a magnification correction system for use with optical equipment in general and, more particularly, to a zoom lens system which compensates for changes of focus size in an automatically focused motion picture or television camera.

The visual effect which is exhibited by a lens system when focused on a far subject and then refocused on a more near subject or vice versa is a change in the magnification. This can produce effects such as causing an object which appears in a picture quite close to the edge thereof to move into and out of the field of view as the camera alternately focuses on near and far subjects. Motion pictures taken without any correction for this magnification difference can be considerably disturbing and this is particularly true of photographic or television cameras which include automatic focusing since transitions from near to far objects is otherwise very smooth.

The present invention incorporates a zoom lens system which operates in cooperation with the movable or taking lens of a camera or other optical system so that changes in the position of the taking lens, as for example under the operation of the autofocus equipment, causes a corresponding change in the zoom lens system to compensate for the change in magnification.

SUMMARY OF THE INVENTION

In the preferred embodiment of the present invention a zoom lens system is incorporated into the normal camera optics which are positioned by an automatic focus system known in the art. More particularly, the camera taking lens, which is movable under the operation of the automatic focus system, carries with it a cam which cooperates with a cam follower connected to the zoom lens system so that changes in the position of the taking lens are accompanied by changes in the zoom focus system to produce a compensation for the change in magnification which occurs.

BRIEF DESCRIPTION OF THE DRAWING

The FIGURE is a cut-away and partially schematic diagram of a camera optical system incorporating a preferred embodiment of the present invention.

DETAILED DESCRIPTION OF THE PREFERRED EMBODIMENT

The FIGURE shows a camera body 10 having an optical axis shown by reference numeral 12 along which a plurality of lenses are shown operable to focus an image of the scene being viewed upon a film plane 14. A first lens 16 is shown mounted in a lens holder 17 which is screw-threaded into the camera body 10 as at 18. Lens 16 would correspond to the normal focusing or taking lens of a camera which moves backwards and forwards along optical axis 12 to keep the image of the scene desired to be photographed focused on the film plane 14. Lens holder 17 is shown having a circumferentially positioned gear portion 20 by means of which the lens holder 17 is rotated within the camera body 10 to cause the desired motion of lens 16 along optical axis 12. Rotation of lens holder 17 through circumferential gear 20 is accomplished by a motor 24 operating through a gear drive including gears 26 and 28. Motor 24 is shown connected as by leads 30 and 32 to an autofocus system 34 which may be of the sort described in the co-pending applications of Norman L. Stauffer, Ser. Nos. 700,829 and 700,963, filed June 29, 1976, and entitled "Single Pass Distance Determining and Automatic Focusing Apparatus with Separately Adjusted Optical Element" and "Distance Determining and Automatic Focusing Apparatus with False Peak Discrimination," respectively, or the co-pending application of Dennis J. Wilwerding, Ser. No. 728,566 filed Oct. 1, 1976, now U.S. Pat. No. 4,059,756, and entitled "Focus Control System," all of which are assigned to the assignee of the present invention. Autofocus system 34 is energized through a switch 36 connected to one terminal of a power source shown as battery 38 whose other terminal is connected to a reference potential as at 39. Motor 24 also has a connection to reference potential as at 40. It is seen that with switch 36 closed as the autofocus system 34 produces signals on lines 30 and 32 indicative of the position of desired focus, motor 24 operating through gears 26, 28 and 20 will cause the rotation of lens holder 17 so as to produce the desired motion of lens 16 along optic axis 12. This rotation will continue until the lens 16 occupies a position with respect to lens elements shown as lenses 44 and 45 such that the desired image is in proper focus on film plane 14.

The problem which exists with the elements thus far described is that as lens 16 moves back and forth along optic axis 12, a change in magnification occurs which is particularly disturbing in motion picture or television viewing since the object being viewed may change size as the system focuses and elements close to the edge of the picture may move in and out of view which is visually disturbing. This problem is overcome in the present invention by supplying a zoom lens system 48 consisting of lenses 50 and 54 shown mounted in a lens housing 56 and movable along optic axis 12. Motion of zoom lens system 48 along axis 12 will cause a change in magnification of the image which reaches the film plane 14 but will not disturb the focus. The present invention causes such motion of the zoom lens system as to compensate for the change in magnification which occurs with motion of lens 16.

Lens housing 56 is shown to be threadedly mounted into a toroidal cup-shaped member 58 which is slideably mounted within an opening of camera body 10 and is biased upwardly in the drawing by a spring 59 resting against the camera body 10 on an abutting surface in the opening. Motion of the toroidal cup-shaped member 58 is controlled by a pin 62 affixed to the toroidal cup-shaped member 58 and which bears on a cam surface 65 on the lower end of lens holder 17. It will be seen that as lens holder 17 rotates, spring 59 will push pin 62 against the surface 65 on the lens holder 17 thus producing corresponding lowering or raising of the toroidal cup-shaped member 58 and of the lens housing 56 and lenses 50 and 54. The shape of cam surface 65 will vary with the optic system being used but should be adjusted so that the motion of lenses 50 and 54 produces a just sufficient change of magnification to offset the change in magnification that occurs with motion of lens 16. Thus, it is seen that as motor 24 drives lens 16 forward or backward, such motion will be accompanied by corresponding motion of lenses 50 and 54 in a compensating manner.

The toroidal cup-shaped member 58 is shown having a motor 70 mounted in one portion thereof which motor is connected by conductors 72 and 73 to switch terminals 74 and 75, respectively. Switch terminals 74 and 75 cooperate with a switch arm 76 which is connected to the battery 38 by a conductor 79. Motor 70 is also shown having a connection to the reference potential as at 80 so that when switch arm 76 is in contact with switch terminal 74, motor 70 will rotate in one direction but when switch arm 76 is in contact with switch element 75, motor 70 will turn in the opposite direction. Motor 70 is shown having a shaft 85 which extends through an aperture in the bottom of toroidal cup-shaped member 58 and carries a gear 87 which cooperates with an idler gear 89 and, in turn, with a gear 90 circumferentially mounted on lens housing 56. Lens housing 56 is shown threadedly engaging the inner surface of the toroidal cup-shaped member 58 as at 92 so that rotation of lens holder 56 will cause motion of lens holder 56 and thus senses 50 and 54 along optic axis 12. It is by this means that the operator of the camera may utilize the zoom lens system 48 in its normal fashion. In other words, should the camera operator desire to independently operate the zoom lens system, he has merely to operate switch arm 76 so that it contacts either switch element 74 or 75 to thus cause rotation of motor 70 and of lens holder 56 thus moving lenses 50 and 54 along axis 12, to change the magnification of the system and produce a desired zoom effect.

It is thus seen that I have provided a system useful in optical systems in general and particularly in camera systems to correct for changes in magnification that occur with changes in focus from near subjects to far subjects and vice versa. It is further seen that I have provided a system which operates in conjunction with an autofocus system to automatically supply such compensation. Further, I have provided a zoom system which is automatically positioned by motion of the taking lens while at the same time allowing the zoom system to be used in its normal fashion. Many changes and modifications will occur to those skilled in the art. For example, the order and arrangement of the lenses shown in the preferred embodiment will vary from application to application; various gear drives may be replaced by alternate motion producing schemes and cam characterization shown herein as a sraight line may be curved or may be replaced by other characterized motion transmitting devices. Furthermore, while having shown the preferred embodiment used in a photographic or television camera system, the invention is useful in other optical systems including range finders, telescopes and microscopes. Accordingly, I do not wish to be limited by the descriptions used in connection with the preferred embodiment but rather wish only to be limited by the scope of the appended claims.

I claim:

1. Apparatus for use in an optical system having an image plane and lens means movable along an axis to provide a focused image of an object at the image plane, and wherein movement of said lens means may produce a change of magnification of the image at the image plane, the improvement comprising:
    zoom means movable along the axis to provide changes in magnification of the image of the object; and
    characterized means connected to said lens means and to said zoom means so that movement of said lens means along said axis is accompanied by movement of said zoom means along said axis, the characterization of said characterized means being so chosen that the amount of movement of said zoom means accompanying a given amount of movement of said lens means is such as to substantially off-set the change of magnification produced by the movement of said lens means.

2. Apparatus according to claim 1 wherein the characterized means is a cam and cam follower.

3. Apparatus according to claim 2 wherein the cam is a characterized surface on the lens means and the follower is a member connected to the zoom means and is biased against the surface by spring means.

4. Apparatus according to claim 1 including motor means connected to said zoom means to move said zoom means along the axis independently of said lens means.

5. Apparatus according to claim 4 wherein the characterized means is a cam and cam follower.

6. Apparatus according to claim 5 wherein the cam is a characterized surface on the lens means and the follower is a member connected to the zoom means and is biased against the surface by spring means.

7. Apparatus according to claim 1 including motor means connected to said lens means to move said lens means along the axis.

8. Apparatus according to claim 7 including an autofocus system connected to said motor means to automatically position said lens means at the proper position to provide the focused image of the object at the image plane.

9. Apparatus according to claim 8 wherein the characterized means is a cam and cam follower.

10. Apparatus according to claim 9 wherein the cam is a characterized surface on the lens means and the follower is a member connected to the zoom means and is biased against the surface by spring means.

11. Apparatus according to claim 1 wherein the optical system is a camera.

12. Apparatus according to claim 11 wherein the camera is a motion picture camera.

13. Apparatus of the class described comprising:
    an optical device having a housing;
    first lens means mounted in the housing for movement along an axis to produce a focused image of an object at an image plane and wherein movement of said lens means may produce a change of magnification of the image at the image plane;
    an autofocus system for producing an output signal indicative of the distance to the object;
    first motor means connected to said autofocus system to receive the output signal and connected to said first lens means so as to position said lens along the axis in accordance with the output signal;
    a movable member mounted for movement along the axis;
    a zoom system mounted on said movable member for movement with respect thereto along the axis;
    cam and follower means connected to said first lens means and to said movable member so that motion of the first lens means is accompanied by motion of both the movable member and said zoom system along the axis, the characterization of said cam and follower means being so chosen that the amount of movement of said zoom means accompanying a given amount of movement of said lens means is such as to substantially offset the change of magnification produced by the movement of said lens means; and
    second motor means connected to said zoom system and operable upon activation to move said zoom system along the axis independently of said movable member.

14. Apparatus according to claim 13 wherein the optical device is a camera.

15. Apparatus according to claim 14 wherein the camera is a motion picture camera.

* * * * *